Nov. 10, 1931.　　R. B. GRISHAM ET AL　　1,831,302
EGG CANDLING AND HANDLING DEVICE
Filed Dec. 31, 1929　　4 Sheets-Sheet 1

Inventors
R. C. Miles,
L. L. Grisham,
R. B. Grisham &
H. H. Vandivort

By Clarence A. O'Brien
Attorney

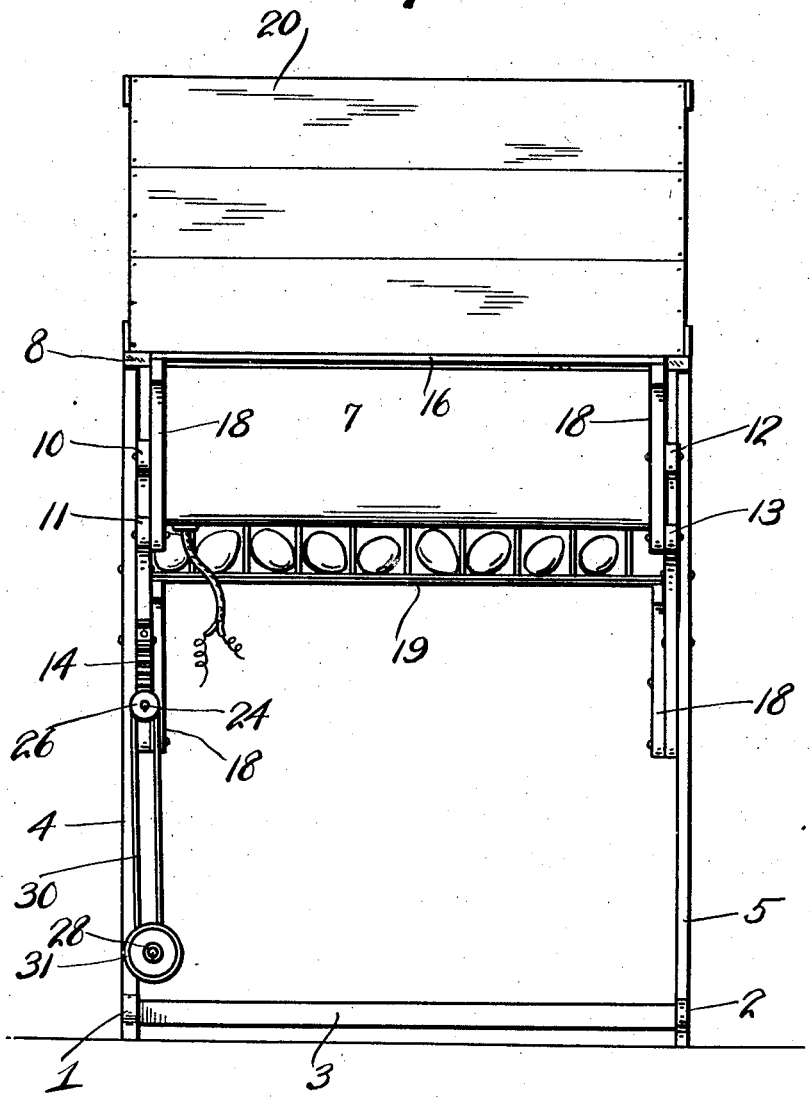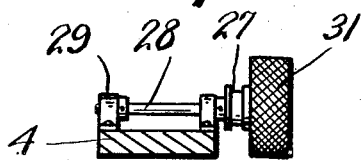

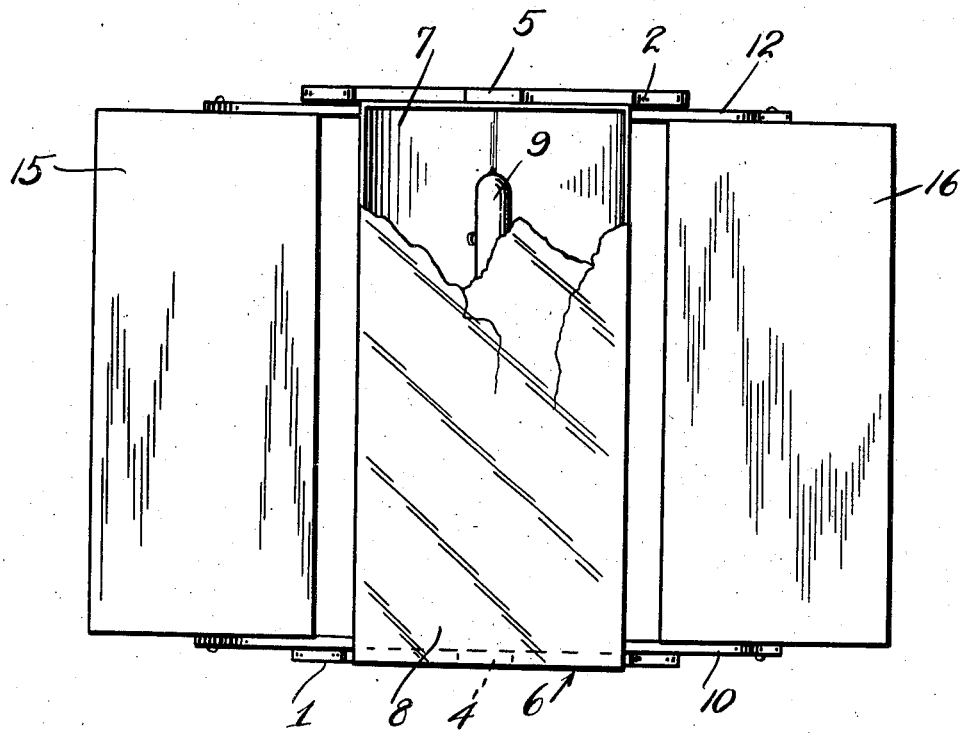
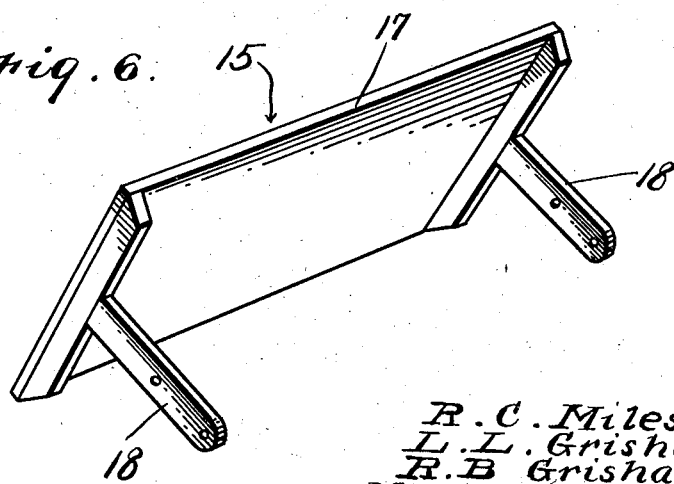

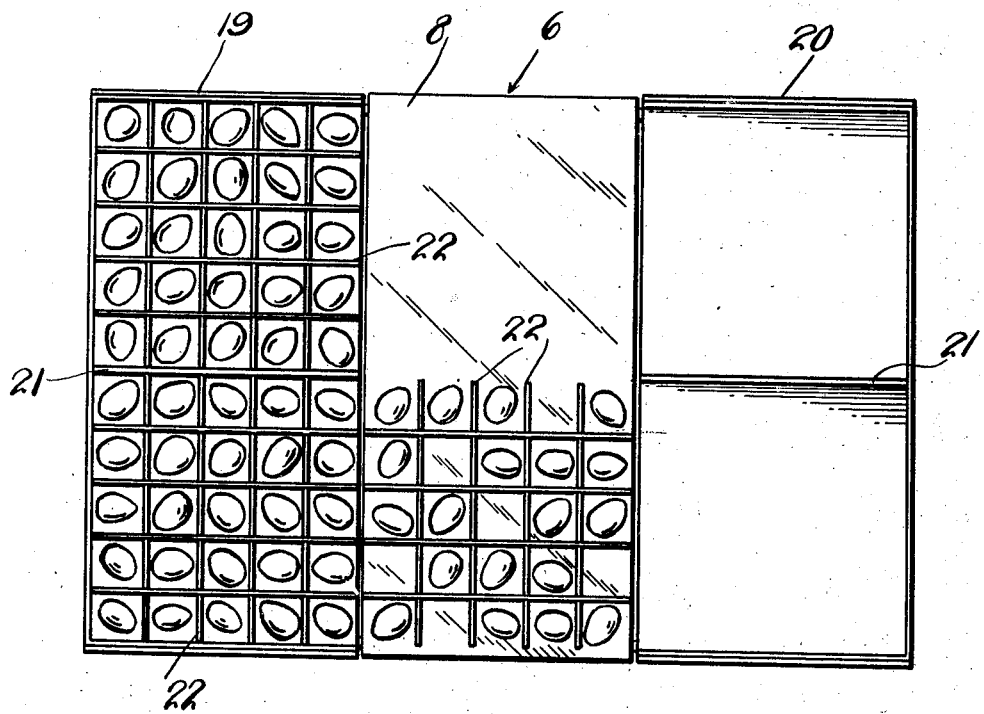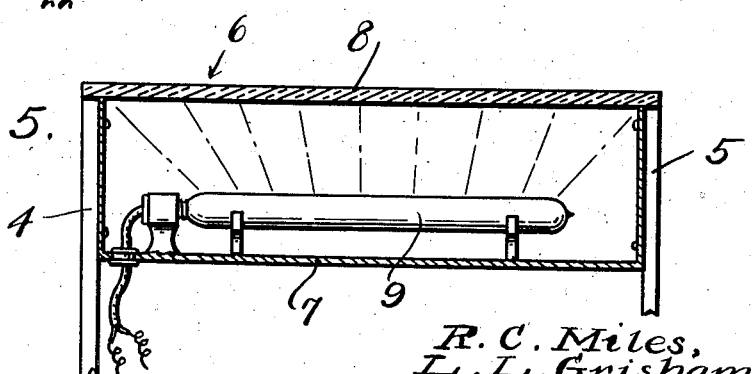

Patented Nov. 10, 1931

1,831,302

UNITED STATES PATENT OFFICE

RICHARD B. GRISHAM, HOMER H. VANDIVORT, LUTHER L. GRISHAM, AND RAY C. MILES, OF ELK CREEK, MISSOURI

EGG CANDLING AND HANDLING DEVICE

Application filed December 31, 1929. Serial No. 417,719.

The present invention relates to improvements in egg candlers and has for its principal object to provide an egg candling and handling device whereby an entire filler containing thirty-six eggs (the usual number) may be properly manipulated for candling the eggs in the filler unit.

It has heretofore been quite difficult to handle a considerable number of eggs at a time in a satisfactory manner and it is therefore one of the aims of the present invention to expedite the handling and candling of an entire filler holding three dozen of eggs in a positive and efficient manner.

A further object is to provide an egg candling and handling device of the above mentioned character which includes a stand having an egg candling unit arranged in a stationary manner thereon, a pair of platforms being arranged on opposite sides of the egg candling unit for vertical movement in opposite directions and upon which platforms are adapted to rest a pair of egg cases having their inner opposed and top sides open so as to facilitate the moving of one filler of eggs from one case onto the candling unit and then placing the filler with the candled eggs into the other case.

A further object is to provide an egg candling and handling device of the above mentioned character wherein means is provided for effecting the actuation of the egg case supporting platform so that as the fillers are removed from one egg case, said egg case will move upwardly and simultaneously the other egg case will become lowered to permit the proper transfer of the fillers with the candled eggs therein in the receiving egg case.

Still a further object is to provide an egg candling and handling device of the above mentioned character which is simple in construction, inexpensive, strong and durable and further well adapted to the purposes for which it is designed.

Other objects and advantages will become apparent during the course of the following description.

In the accompanying drawings, forming a part of this specification, and in which like numerals indicate like parts throughout the same:

Figure 2 is a front elevation thereof.

Figure 3 is a fragmentary top plan view.

Figure 4 is a view similar to Figure 3 showing the egg cases supported on the vertically movable platforms, one filler containing a predetermined number of eggs being shown positioned on the glass plate of the candling units.

Figure 5 is a longitudinal sectional view through the egg candling unit.

Figure 6 is a detail perspective view of one of the egg case supporting platforms.

Figure 8 is a similar section taken approximately on the line 8—8 of the same figure.

Figure 1:
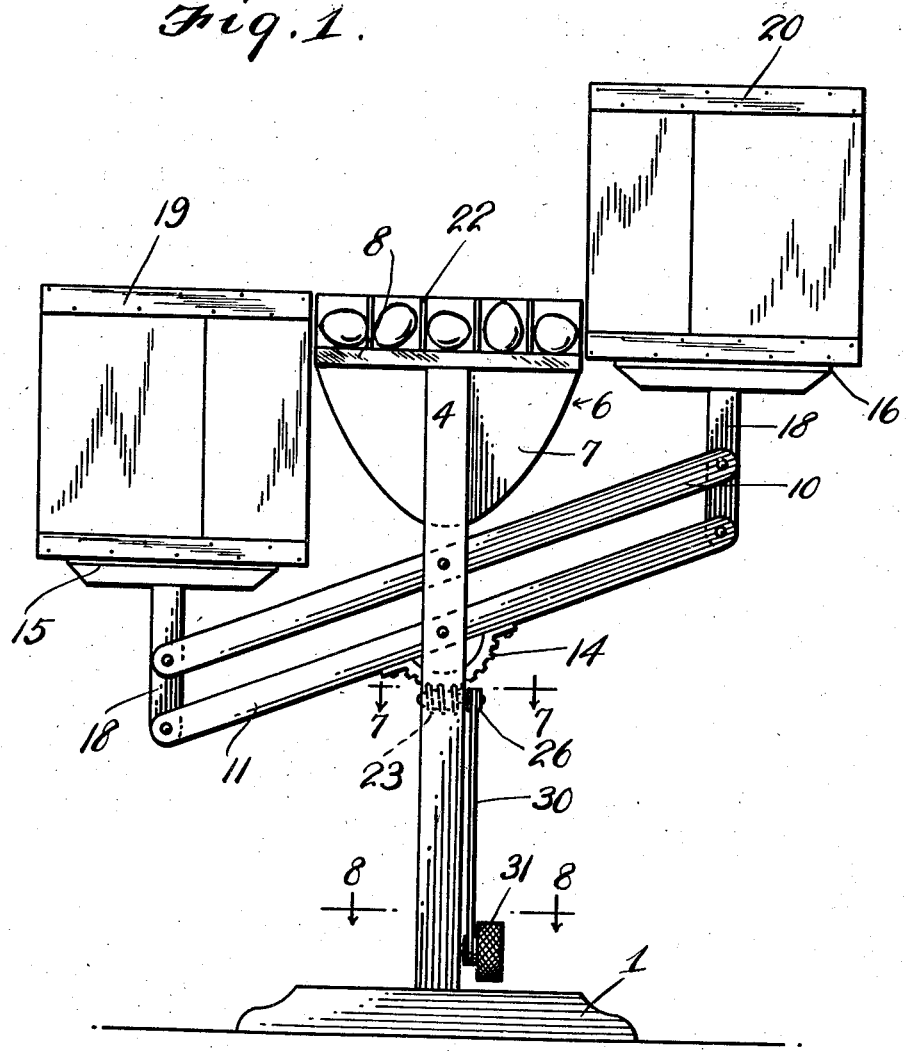
Figure 1 is a front elevation of the egg candling and handling device embodying our invention showing one filler full of eggs in the act of undergoing candling.
Figure 7:
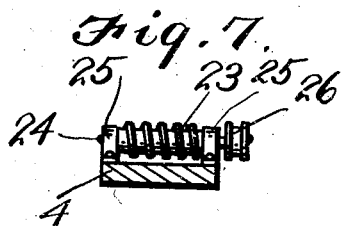
Figure 7 is a transverse section taken approximately on the line 7—7 of Figure 1.

In the drawings wherein for the purpose of illustration is shown the preferred embodiment of our invention, the numerals 1 and 2 designate a pair of spaced base members that are connected together by the cross bar 3 as clearly indicated in Figure 2.

Front and rear standards 4 and 5 extend upwardly from the respective base members and secured between the upper ends of the spaced standards is the egg candling unit denoted generally by the numeral 6. This unit includes a lamp box or casing 7 that is open at its top side, the same being secured between the upper ends of the standards in the manner as suggested in Figure 5.

The inner surface of the lamp housing is coated to provide a reflector and, as is shown more clearly in Figure 1, the lamp box or casing is of substantially parabolic shape in cross section.

A glass plate 8 is arranged over the upper open side of the lamp box and an electric lamp 9 is mounted within the lamp box, the current being supplied thereto from any suitable source and the light rays are projected upwardly through the glass plate 8 for candling the eggs as the same are placed upon the glass plate in the manner to be presently described.

A pair of vertically spaced rocker arms 10 and 11 respectively are pivotally secured at their intermediate portions on the front standard 4 at a point below the stationary candling unit 6. A similar pair of rocker arms 12 and 13 are pivotally secured at their intermediate portions on the rear standard 5.

A segmental worm wheel 14 is secured on the bottom edge of the intermediate portion of the rocker arm 11 and the purpose thereof will be presently described.

The invention further comprehends the provision of a pair of egg case supporting platforms 15 and 16 respectively that are arranged on opposite sides of the egg candling units for vertical movement. In Figure 6 of the drawings, there is illustrated in detail the construction of each of these platforms and it will be observed that each platform comprises a rectangular shaped base 17 that has secured to the under side at each end thereof the substantially T-shaped bracket 18. The front rocker arms 10 and 11 are operatively connected at their outer ends to the respective leg portions of the T-shaped bracket that depend from the forward ends of the platform while the rear pair of rocker arms are connected in a similar manner to the leg portions of the rear pair of T-shaped brackets.

An egg case 19 is adapted to rest on the platform 15 while a similar egg case 20 rests on the complementary platform 16. Each egg case is open at its inner side as well as at its top and each egg case has a central transverse partition 21. On opposite sides of the partition are the tiers of fillers 22 that are supported by the usual cardboard pieces.

Initially, the egg case 19 is filled with these fillers and each filler preferably contains thirty-six eggs. The other egg case 20 is emptied when the apparatus is assembled for use.

Forming a salient part of the present invention is the actuating means associated with the rocker arms whereby the platforms may be raised and lowered simultaneously. The rocker arm actuating means comprises a worm 23 that is arranged on a shaft 24 journaled for rotation within suitable bearings 25 secured on the inner sides of the front standard 4 in such a manner as to permit the worm 23 to engage with the teeth of the segmental worm wheel 14. A pulley 26 is secured on one end of the shaft 24 and this pulley is arranged in alinement with a similar pulley 27 carried by the transverse shaft 28 and is journaled in suitable brackets 29 secured on the inner face of the lower end portion of the front standard 4.

A driving belt 30 is trained over the alined pulleys 26 and 27 and secured on the outer end of the drive shaft 28 for actuating the same is the foot engaging wheel 31.

The operation of our improved egg candling and handling apparatus may be briefly stated as follows: Normally the platform 15 is in its lowermost position while the opposite platform is in its raised position. A full case of eggs is placed on the platform 15 while an empty case is positioned on the platform 16.

The topmost filler 22 containing the eggs to be candled are slid from the egg case 19 on to the glass plate 8 and when the lamp 9 is burning, the eggs in the filler positioned on the glass plate can be readily and easily candled.

After the candling of the eggs has been completed, the filler together with the eggs is slid into the respective compartment of the empty egg case 20. The operator then actuates the foot wheel 31 to operate the rocker arms so as to move the platform 15 with the egg case 19 thereon upwardly a predetermined distance and at the same time the platform 16 with the egg case thereon will be lowered and in this manner, the next pair of fillers filled with eggs may be slid off of the tiers of fillers in the egg case, brought onto the glass panel or plate 2 for candling purposes, and after the candling operation has been completed, said fillers are moved into position on top of the subjacent fillers previously positioned in the egg case 20.

The rocker arms are continued to be actuated until the egg case 19 has been emptied and the egg case 20 has been filled and the filled case 20 is removed from the platform and the open sides and top thereof are covered so that said case of candled eggs is ready for shipment.

It will thus be seen from the foregoing description, that we have provided an egg candling and handling device that will permit the candling of a considerable number of eggs at a time in a positive and efficient manner thus expediting the candling operation and further the eggs can be candled with less possibility of breakage than by the apparatus and methods now commonly in use. The simplicity of our device enables the same to be readily and easily operated and furthermore the device will at all times be positive and efficient in carrying out the purposes for which it is designed.

While we have shown the preferred embodiment of our invention, it is to be understood that various changes in the size, shape and arrangement of parts may be resorted to without departing from the spirit of the invention and the scope of the appended claims.

Having thus described our invention, what we claim as new is:

1. An egg candling and handling device of the character described comprising a pair of standards, a stationary egg candling unit supported between the upper end portions of the standards, a pair of vertically spaced bars pivotally mounted intermediate their ends on each standard beneath the candling unit, brackets pivotally connected to the free end portions of each pair of bars in a manner to connect said pairs of bars together for simultaneous swinging movement in parallelism, case supporting platforms mounted on the brackets for movement adjacent opposite sides of the candling unit, and manually operable means for rocking the bars in a manner to move the platforms relative to the candling unit.

2. An egg candling and handling device of the character described comprising a pair of standards, a stationary egg candling unit supported between the upper end portions of the standards, a pair of vertically spaced bars pivotally mounted intermediate their ends on each standard beneath the candling unit, brackets pivotally connected to the free end portions of each pair of bars in a manner to connect said pairs of bars together for simultaneous swinging movement in parallelism, case supporting platforms mounted on the brackets for movement adjacent opposite sides of the candling unit, and manually operable means for rocking the bars in a manner to move the platforms relative to the candling unit, said means comprising a segmental worm wheel fixed to an intermediate portion of the lower edge of one of the lowermost bars and depending therefrom concentrically with the axis thereof, a worm gear operatively engaged with the worm wheel, a pulley fixed to the worm gear, bearings mounted on the lower portion of the adjacent standard, a shaft journalled in the bearing, a pulley fixed on the shaft, a foot actuated knurled wheel fixed on the shaft, and an endless drive belt trained over the pulleys.

In testimony whereof we affix our signatures.

RICHARD B. GRISHAM.
HOMER H. VANDIVORT.
LUTHER L. GRISHAM.
RAY C. MILES.